United States Patent [19]

Abdale et al.

[11] 3,717,823
[45] Feb. 20, 1973

[54] METAL-GLASS LASER WINDOW ASSEMBLY

[75] Inventors: John M. Abdale, East Meadow; Robert J. Gartner, Carle Place, both of N.Y.; Karl J. Knudsen, Oradell, N.J.

[73] Assignee: Sperry Rand Corporation, New York, N.Y.

[22] Filed: Sept. 20, 1971

[21] Appl. No.: 181,899

[52] U.S. Cl. .................................331/94.5, 350/319
[51] Int. Cl. ...........................H01s 3/02, H01s 3/22
[58] Field of Search ........331/94.5; 330/4.3; 350/319

[56] References Cited

UNITED STATES PATENTS 3,555,450   1/1971   Rockwell, Jr. .....................331/94.5
3,420,603   1/1969   Whilems ............................331/94.5

OTHER PUBLICATIONS

Hornbeck, High Temperature Seal of Sapphire Windows to Ceramics, The Rev. of Sci. Instr., Vol. 36, No. 6 (June 1965) pg. 845.

Primary Examiner—William L. Sikes
Attorney—S. C. Yeaton

[57] ABSTRACT

A laser tube end window assembly comprising a first apertured metallic plate bonded to an end of the laser tube with the aperture aligned with the tube bore, a second apertured metallic plate also positioned with its aperture aligned with the tube bore and sealed about its periphery to the periphery of the first plate, and an optical window secured within the aperture of the second plate.

4 Claims, 2 Drawing Figures

PATENTED FEB 20 1973　　　　　　　　　　　3,717,823

INVENTORS
JOHN M. ABDALE
ROBERT J. GARTNER
KARL J. KNUDSEN
BY

*H.P. Terry*

ATTORNEY

METAL-GLASS LASER WINDOW ASSEMBLY

BACKGROUND OF THE INVENTION

1. Field of the Invention

The present invention relates generally to laser tubes and more particularly to window assemblies used for sealing the ends of the tubes and to the method of making and securing such assemblies to the tubes.

2. Description of the Prior Art

It has been the customary practice heretofore in the construction of gas laser tubes to effect a hermetic seal between each end of the tube and an associated optical window by means of either a thermal bonding or epoxy gluing technique. In the case of thermal bonding the seal is made by holding the window and tube end in contact and raising the temperature to the melting point in the region of contact, as by r.f. induction or oven heating. The temperatures required for making such thermal bonds are on the order of at least several hundred degrees centigrade and have the concomitant effect of degrading the laser quality surface finish of the optical window which in turn adversely affects light output during lasing operation. This problem can be avoided by using the epoxy gluing technique, but then unfortunately other problems arise. For instance, the epoxy constituents tend to leak into the gas fill of the tube thereby causing contamination of the gas and seriously diminishing tube life. In addition, during the tube life stability of operation with regard to lasing threshold, gain and power output progressively deteriorate due to the contamination. Another disadvantage of the epoxy technique is that it inhibits proper bakeout for removing contaminants during construction of the tube. It is generally desired that a bakeout be performed with the tube heated to a temperature of about 400° centigrade while connected to a vacuum pump for evacuating water vapor and other contaminants which accumulated in the tube during manufacture. Epoxy has the characteristic, however, that it tends to become brittle and subject to breaking or cracking when heated above approximately 75° centigrade. Moreover, heating of the epoxy to temperatures in excess of this level tends to accelerate the aforementioned contamination process associated with leaking of the epoxy constituents into the laser gas.

In view of the foregoing limitations inherent in the prior art, it is a principal object of the present invention to provide a novel and improved laser end window assembly and method for constructing such assembly wherein the problems attendant to the use of epoxy or direct thermal bonding between the window and tube end are avoided.

SUMMARY OF THE INVENTION

A laser end window assembly embodying the principles of the present invention is constructed by high temperature bonding an end of the laser tube to a metallic plate having an aperture aligned with the tube bore and likewise high temperature bonding an optical window within the aperture of another metallic plate. The optical window is then polished to a laser quality surface finish and finally the apertured plates are welded together about their respective peripheries to provide a hermetic seal at the tube end. The completed product therefore comprises a first apertured metallic plate bonded to the end of the laser tube, a second apertured metallic plate sealed to the periphery of the first plate, and an optical window bonded within the aperture of the second plate in aligned relation with the tube bore and aperture of the first plate.

DESCRIPTION OF THE PREFERRED EMBODIMENT

Figure 2:
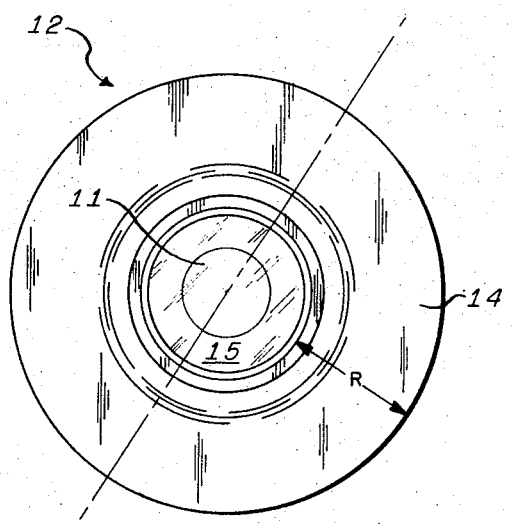
FIG. 2 is an end perpendicular view of the window assembly shown in FIG. 1.
Figure 1:
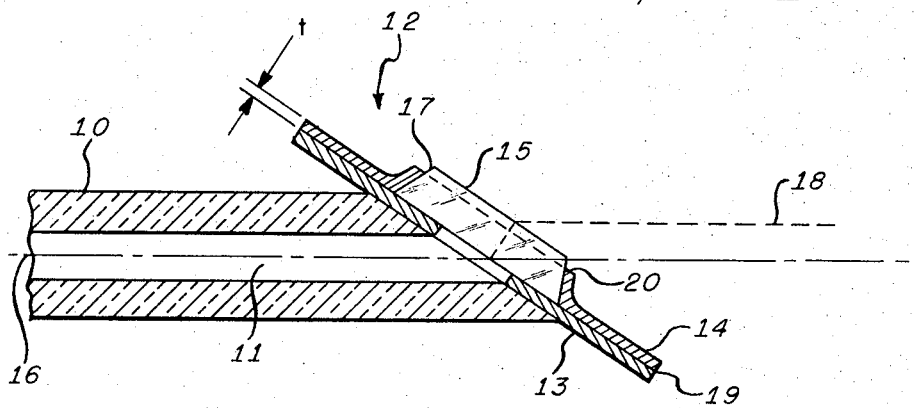
FIG. 1 is a partial side view of a laser tube illustrating the connection thereof to an optical window assembly constructed in accordance with the principles of the present invention.

Referring to the figures, an end portion of a laser tube 10 typically constructed of pyrex glass has a central bore 11 which is conventionally filled with a suitable lasing gas. Only one end of the tube is shown for simplicity of description and illustration inasmuch as the details of construction may be the same for both ends. As indicated, the end is cut at Brewster's angle to achieve the normal light polarizing action associated therewith but this is not essential for the purpose of the invention. Illustrative diametral dimensions of the tube and center bore are 9 mm and 3 mm respectively. A hermetically sealing enclosure is provided at the tube end by means of an optical window assembly 12 comprising apertured plates 13 and 14 and window 15.

The window assembly is fabricated and secured to the tube end in the following manner. Apertured plate 13 is positioned along the extension of the tube axis 16 in contact with the end of the tube in generally concentric relation with the tube bore and is then bonded to the tube by raising the temperature thereabout, as by r.f. induction heating to approximately 700° C, at which point the pyrex tube end melts and adheres to the plate. Optical window 15 is bonded about its periphery 17 within the aperture of plate 14 in an oven while being held in a fixture to control position and shape of the glass, or if desired, r.f. induction may be used for this bond also. The optical window has a thickness measured normal to its major light transmissive surfaces typically about 2 mm and a diameter sufficient to accommodate the light refracted therethrough. The apertured plates are typically made of a metal such as kovar or other metal having a thermal coefficient of expansion approximating or closely matching that of the selected pyrex or other material used to make the laser tube and optical window. The diameter of the aperture in plate 13 is preferably of such size that when bonded to the ends of the tube it closely conforms to the circumference of the tube bore. The plate 13 is, of course, in contact with the laser fill gas at the edge of its aperture and may therefore be used as an anode of the laser tube. Dashed line 18 indicates the direction of light refraction through the optical window.

The extreme heat applied to the optical window during the process of bonding it to the plate 14 degrades the quality of its surface finish as hereinbefore explained. At this point in the fabrication process, however, the window is merely bonded to plate 14 and not yet sealed to the tube end. Thus, both surfaces of the window are readily accessible for polishing to a laser quality finish. In view of the fact that the window surface finish is degraded during bonding to the plate 14, it is the presently preferred economical practice to use unpolished windows of high optical transmissive quality for bonding to the plate and then, after bonding, the surfaces are polished to a laser quality finish. Both a laser quality surface finish and an optical quality transmissive characteristic are required to minimize light losses during lasing operation.

As a final step in making the window assembly, plate 14, with the optical window 15 bonded thereto, is held against plate 13 in overlapping relation therewith and sealed thereto by heliarc welding about the peripheral edges indicated by numeral 19. The heliarc welding may be performed, for example, by positioning the plate 13, which is bonded to the tube end, in contacting relation with the plate 14 which is bonded to the optical window, and synchronously rotating them about an axis normal to the window assembly so as to carry the peripheral edges of the plates past a stationary heliarc at a predetermined speed. Since it is known that the optical window will be damaged by a temperature of approximately 400° C, the radial dimension R of plate 14 relative to its thickness dimension $t$ is selected to provide a sufficient temperature drop (thermal resistance) from the peripheral edge 19 to the aperture edge 20 to maintain the temperature thereat below the damaging level. Hence, if the heliarc produces a temperature of 1450° C at the periphery of the plates and it is desired to prevent the temperature at the edge of the aperture in plate 14 from rising above say 250° C, a temperature drop of 1200° must occur across the dimension R. Since the temperature drop across the plate is directly proportional to the dimension R and inversely proportional to the cross-sectional area of the plate, that is, the product of R and $t$, the desired result is achieved by increasing R and decreasing the thickness $t$ in appropriate amounts to achieve a sufficient ratio therebetween. For equivalent thicknesses of plates 13 and 14, the required temperature drop will also occur in plate 14 because of its greater radial length from the aperture edge to the periphery. Typical R and $t$ dimensions of 0.1 inch and 0.02 inch respectively for Kovar, have been used successfully with a heliarc temperature of 1450° C.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A laser tube to which an end window assembly is sealed wherein the window assembly comprises
   a first apertured metallic plate member bonded to an end of the laser tube with the aperture aligned with the bore of the tube,
   a second apertured metallic plate member positioned with its aperture aligned with the tube bore and sealed at or near and about its periphery at or near the periphery of the first plate member, and
   an optical window secured within the aperture of the second plate member by a bond between the periphery of said window and the edge of the aperture in said second member.

2. The apparatus of claim 1 wherein the radial dimension from the edge of the apertures of the respective plates to the periphery thereof and the thickness of the related plate are proportioned to provide a predetermined temperature drop across said radial dimension.

3. The method of constructed laser tube end window comprising the steps of
   bonding a first apertured metallic plate to an end of the laser tube with the aperture aligned with the tube bore by heating the tube to its melting temperature in the region of contact with the plate,
   bonding an optical window within the aperture of a second apertured metallic plate by heating the optical window to its melting temperature in the region of contact with the plate,
   polishing the major light transmissive surfaces of the optical window to a laser quality finish, and
   welding the first and second apertured plates together at or near and about their peripheries such that the optical window is aligned with the tube bore.

4. The method of claim 3 wherein the radial dimension from the edge of the apertures of the respective plates to the periphery thereof and the thickness of the related plates are proportioned to provide a predetermined temperature drop across said radial dimension.

* * * * *